US006707824B1

United States Patent
Achilles et al.

(10) Patent No.: US 6,707,824 B1
(45) Date of Patent: Mar. 16, 2004

(54) METHOD AND APPARATUS FOR FLEXIBLE EGRESS TRAFFIC QUEUING

(75) Inventors: Heather Achilles, Hudson, NH (US); Paul Gallo, Newton, MA (US); Mark Podlipec, Shrewsbury, MA (US); Peter Pothier, Townsend, MA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/314,620

(22) Filed: May 19, 1999

Related U.S. Application Data

(60) Provisional application No. 60/086,078, filed on May 20, 1998.

(51) Int. Cl.⁷ .............................................. H04L 12/56
(52) U.S. Cl. ..................... 370/412; 370/395.4; 370/429
(58) Field of Search ................................. 370/412–418, 370/428–429; 710/54, 52, 39, 112; 709/314

(56) References Cited

U.S. PATENT DOCUMENTS

| | | | | |
|---|---|---|---|---|
| 5,056,011 A | * | 10/1991 | Yoshitake et al. ............. | 710/28 |
| 5,742,587 A | * | 4/1998 | Zornig et al. ................ | 370/235 |
| 6,044,061 A | * | 3/2000 | Aybay et al. ................ | 370/230 |
| 6,092,116 A | * | 7/2000 | Earnest et al. .............. | 709/236 |
| 6,141,323 A | * | 10/2000 | Rusu et al. .................. | 370/236 |
| 6,160,812 A | * | 12/2000 | Bauman et al. ............. | 370/416 |
| 6,201,792 B1 | * | 3/2001 | Lahat ........................... | 370/236 |
| 6,222,822 B1 | * | 4/2001 | Gerardin et al. ............. | 370/230 |
| 6,377,583 B1 | * | 4/2002 | Lyles et al. .................. | 370/412 |
| 6,424,621 B1 | * | 7/2002 | Ramaswamy et al. ...... | 370/230 |
| 6,510,164 B1 | * | 1/2003 | Ramaswamy et al. ...... | 370/466 |

\* cited by examiner

*Primary Examiner*—Chi Pham
*Assistant Examiner*—Thai D Hoang
(74) *Attorney, Agent, or Firm*—Blakely Sokoloff Taylor & Zafman LLP

(57) ABSTRACT

A method, apparatus and article of manufacture for enabling flexible egress traffic queuing. A queue selection word is generated and a data queue is monitored for data. An output mask word is generated associating the data queue to an output channel and a priority value if the data queue contains data. The output channel is processed according to the queue selection word and the output mask word.

6 Claims, 3 Drawing Sheets

METHOD AND APPARATUS FOR FLEXIBLE EGRESS TRAFFIC QUEUING

CROSS-REFERENCES TO RELATED APPLICATIONS

This application claims the benefit of U.S. Provisional Application No. 60/086,078 entitled "Big Access Concentrator" filed May 20, 1998.

FIELD OF THE INVENTION

This invention relates generally to computer networks, and more particularly, to a method and apparatus for flexible egress traffic queuing.

BACKGROUND OF THE INVENTION

In the field of data routing in computer networks, an Internet service provider (ISP) user typically has much more stringent requirements than an enterprise user because the routers will be subjected to the adverse Internet routing environment in the world. There are three typical architectural requirements that such routers must support, described below.

A. Stable Operation

Although it sounds trivial, the notion of stable operation has been elusive in the ISP community, as witnessed by various Internet "brown-outs" since it's inception. One paper on Internet scaling "Scaling the Internet during the T3 NSFNET Years", C. Villamizar, Oct. 22, 1997, articulates the basic requirements which ISPs demand from their networking equipment in order to provide a stable network. In addition to forwarding performance and scaling requirements, ISPs typically expect several operational attributes, given below.

1. Stability under adverse conditions. The router must remain stable and deterministic under arbitrarily high traffic loads or a flood of routing update changes.
2. Low packet loss to stable destinations. The effects of unstable routes (flapping) should not impact a router's ability to forward traffic to stable routes.
3. Reasonable fairness and congestion control. Sufficient buffering capacity, avoidance of head-of-line blocking, advanced queueing algorithms, and sophisticated discard techniques must be provided.

B. Service Differentiation

Recently it has become clear that service providers cannot make adequate margins by offering flat-rate access and undifferentiated service. The ability to offer tiered services, and to guarantee service levels, is crucial to the economic and competitive health of ISPs. The airline industry's first-class, business-class and coach-class offerings provide a meaningful analogy for Internet service differentiation: a small number of customers are willing to pay for premium service, if it can be guaranteed. The concentrator's must enable ISPs to offer differentiated services based on multiple queues and advanced, intelligent Traffic Management features.

C. Superior Reliability

ISP routers must provide a greater level of reliability and availability than known router architectures. Part of this flows from designing with stability in mind, but providing additional fault tolerance features adds another dimension of resiliency. ISP routers should be designed without any single points of failure, and all software designs should incorporate fault isolation principles.

Therefore, there is a need for a way to route data in computer networks that provides stable operation, service differentiation, and superior reliability. Such an invention should be stable under adverse conditions, insure low packet loss to stable destinations, and provide reasonable fairness and congestion control.

SUMMARY OF THE INVENTION

The present invention provides a method, apparatus and article of manufacture for enabling flexible egress traffic queuing. A queue selection word is generated and a data queue is monitored for data. An output mask word is generated associating the data queue to an output channel and a priority value if the data queue contains data. The output channel is processed according to the queue selection word and the output mask word.

BRIEF DESCRIPTION OF THE DRAWINGS

The present invention is illustrated by way of example and may be better understood by referring to the following description in conjunction with the accompanying drawings, in which like references indicate similar elements and in which.

DETAILED DESCRIPTION OF AN EMBODIMENT OF THE PRESENT INVENTION

In the following description of a preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the disclosed technology. A preferred embodiment of the disclosed technology, described below, enables a remote computer system user to execute a software application on a network file server.

As shown in the figures and as described below, the disclosed technology provides a means for routing incoming data packets on a network to one or more output queues. In one embodiment, the network traffic from six incoming T3 lines is routed to 512 output queues. When one output queue is filled, no new packets can be routed to that output queue until it is emptied. With such a routing architecture, it is desirable to spread out the latency between the output queues and not group all data packets together. The disclosed technology provides a way to assign a priority to the output queues so as to insure some bandwidth to lower priority queues.

The disclosed technology provides a method, apparatus and article of manufacture for enabling flexible egress traffic queuing. A queue selection word is generated and a data queue is monitored for data. An output mask word is generated associating the data queue to an output channel and a priority value if the data queue contains data. The output channel is processed according to the queue selection word and the output mask word.

Figure 1:
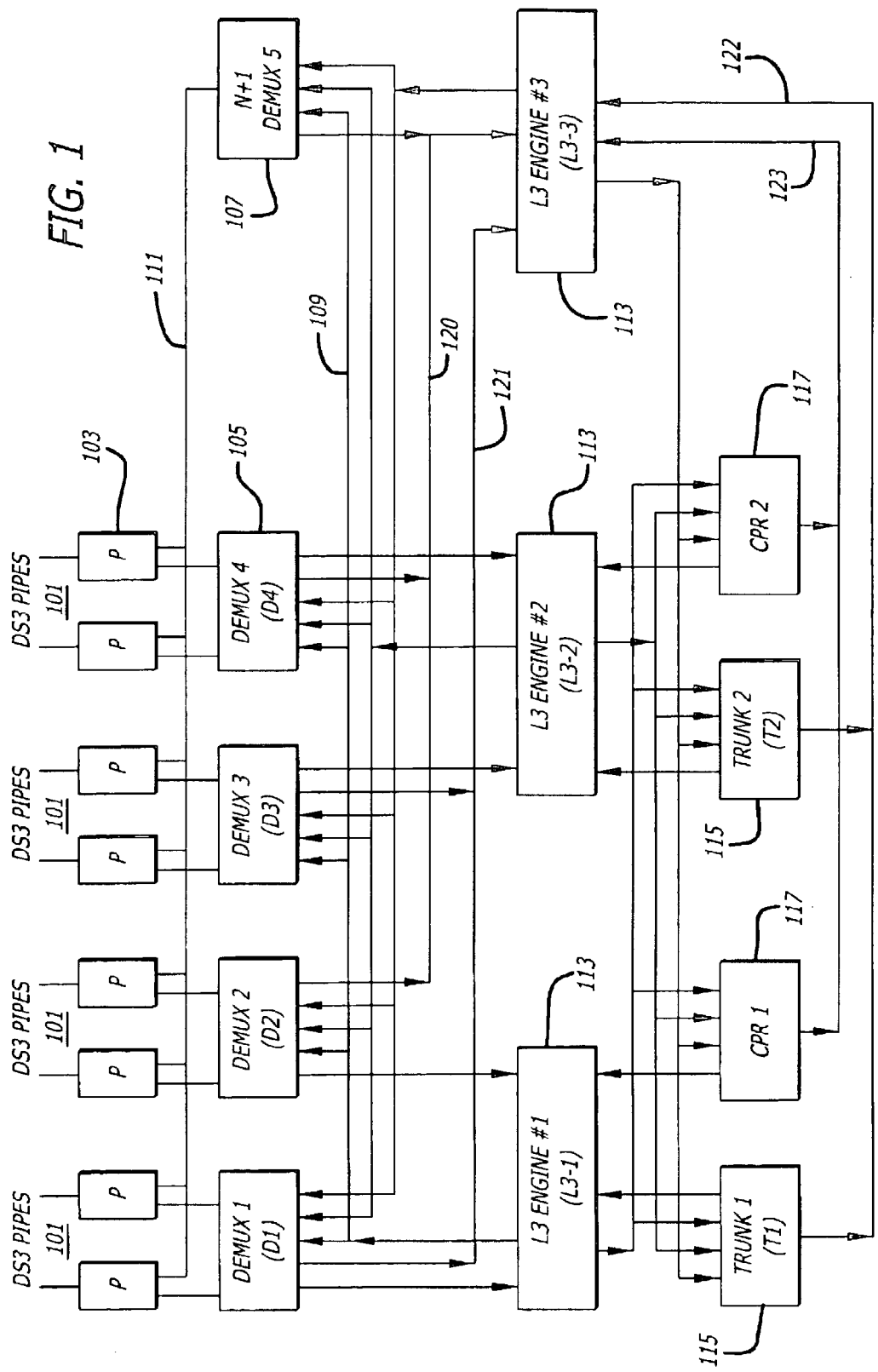
FIG. 1 is a block diagram of a flexible egress traffic architecture compatible with the present invention.

FIG. 1 shows a logical block diagram of an embodiment of the disclosed technology. The incoming ports connect the system to a network via channelized DS3 pipes 101. The system can have up to 32 DS3 inputs. Each DS3 line is connected to a Phy card 103 which handles the analog input.

The Phy card 103 is directly connected to an demux card 105, also known as an access processor engine (APE), which contains the logic to separate the DS3 data into individual HDLC streams and creates separate packets per channel. The demux card 105 supports up to 128 channels per OC3 equivalent. Each demux card 105 contains logic to support up to six DS3 pipes. There are a total of up to five APEs in the system, four of which support the physical interconnect and the fifth for N+1 redundancy. The fifth demux card 107 connects to all of the Phy cards via a bus 111 and can take over for any of the APEs if they fail. The redundant demux card 107 can also take its own Phy card(s) if a user does not care to have the redundancy. In this configuration, the L3 engines will be oversubscribed.

The demux cards 105 are also connected to the L3 engines 113. The L3 engines 113 are responsible for performing the IP forwarding on each packet. Each L3 engine 113 can handle forwarding for twelve DS3 pipes, one trunk card 115 and one central processing engine (CPR) card 117. If all three L3 engines 113 are installed in the system, the forwarding load will be balanced across all of them. If one fails, the other two pick up the balance for the forwarding.

As shown in FIG. 1, there are two trunk cards 115 and two CPR cards 117. The trunk cards 115 give access into the internal POP network. Each trunk card 115 supports an OC12 ATM interface. The CPR cards 117 are used as the route determination engine and for control of the system.

An L3 engine 113 may service demux cards 105, 107, one trunk card 115, and one CPR card 117. To allow flexibility in which cards a given L3 engine services, four shared busses 120–123 connect the various cards to the L3 engines 113 instead of single point-to-point connections. This allows the third L3 (L3-3) engine to service the same cards as either of the first two L3 engines (referred to as "L3-1 engine" and "L3-3 engine"). D2 and D4 105 share the first bus 120. D1 and D3 105 share the second bus 121. T1 and T2 115 share the third bus 122. CPR1 and CPR2 117 share the fourth bus 123. The L3-3 engine may service the cards normally serviced by the L3-1 engine by enabling each of the D1, D2, CPR1 and T1 cards onto one of the four shared busses 120–123. The L3-3 engine may service the cards normally serviced by the L3-2 engine by enabling each of the D2, D3, CPR2 and T2 cards onto one of the four shared busses 120–123. When all three L3 engines 113 are installed, the third L3 engine 113 may be used for IP forwarding for up to two demux cards 105 in order to reduce the burden on the other two processors 113. The cards serviced by the three L3 engines 113 in various L3 failure configurations are shown below in Table 1.

TABLE 1

L3 failure configurations.

|       | No Failure      | L3-1 Fails          | L3-2 Fails         | L3-3 Fails         |
|-------|-----------------|---------------------|--------------------|--------------------|
| L3-1  | D1, T1, CPR1    |                     | D1, D2, T1, CPR1   | D1, D2, T1, CPR1   |
| L2-2  | D4, T2, CPR2    | D3, D4, T2, CPR2    |                    | D3, D4, T2, CPR2   |
| L3-3  | D2, D3          | D1, D2, T1, CPR1    | D3, D4, T2, CPR2   |                    |

Case 1: All three L3 engines installed, no failures. The forwarding load is distributed across all L3s. D2 and D3 are enabled onto the busses 120, 121 going to the L3-3 engine.

Case 2: All three L3 engines installed, L3-1 engine fails. The L3-2 and L3-3 engines are reconfigured to service different cards. First, D3 is switched from the L3-3 engine back to the L3-2 engine. Next, D1, CPR1 and T1 are enabled onto the shared busses 121–123 going to the L3-3 engine. Note that D3 is switched to the L3-2 engine because it shares the second bus 121 with D1. D1 normally is serviced by the L3-1 engine so it must use the second bus 121 to go to the L3-3 engine.

Case 3: All three L3 engines installed, the L3-2 engine fails. The L3-1 and L3-3 engines are reconfigured to service different cards. First, D2 is switched from the L3-3 engine back to the L3-1 engine. Next, D4, CPR2 and T2 are enabled onto the shared busses 120, 122, 123 going to the L3-3 engine. Note that D2 is switched to the L3-1 engine because it shares the first bus 120 with D4. D4 normally is serviced by the L3-2 engine so it must use the first bus 120 to go to the L3-3 engine.

Case 4: All three L3s installed, the L3-3 engine fails. The L3-1 and L3-2 engines are reconfigured to service different cards. First, D3 is switched from the L3-3 engine back to the L3-2 engine. Next, D2 is switched from the L3-3 engine back to the L3-1 engine.

Figure 2:
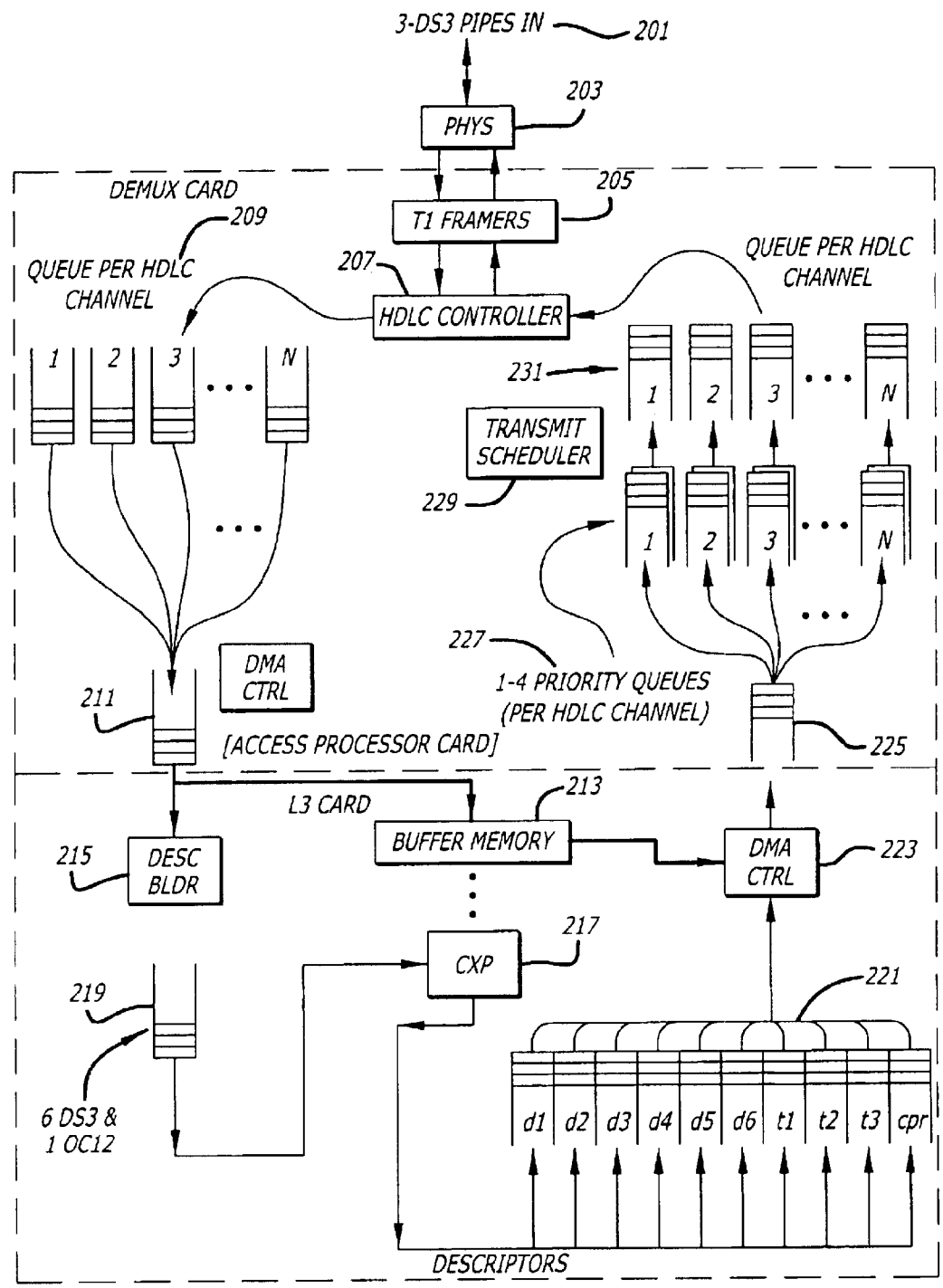
FIG. 2 is a block diagram of a basic hardware forwarding path compatible with the present invention.

In one embodiment of the disclosed technology, basic data packet forwarding is performed as shown in FIG. 2. Data typically is received from one or more DS3 pipes 201 and is relayed through the Phys 203 and the T1 205 framers. The data is then sent to an HDLC controller 207 which, in one embodiment, dechannelizes the data into 128 channels 209. Frames are dequeued from the per-channel HDLC receive (Rx) queues 209 that are filled by the HDLC controller 207. Data frames of the data are queued onto a single queue 211 destined for buffer memory 213 on a L3 forwarding engine card, and the originating channel from the receive queues 209 is tagged onto the frames. The frames are transferred from the single queue 211 to the buffer memory 213, in one embodiment, via a direct memory address (DMA) transfer. A buffer is typically allocated for the DMA transfer from the single queue 211, and the entire frame is transferred into a contiguous buffer in buffer memory 213. A descriptor builder 215 creates a frame descriptor from the channel, the frame length, the buffer index, the IP header, the TCP/UDP ports and the TCP flags. The frame descriptor is then tagged onto the frames.

The L3 engine 113 includes a CXP processor (CXP) 217. If the Point-to-Point Protocol (PPP) header of the frame is not the appropriate value for an IP frame, such as a PPP Link Control Protocol (LCP) or Network Control Protocol (NCP) frame or a non-IP frame, then the CXP 217 is backed when it reads the descriptor of a frame from the descriptor queue 219. Otherwise, the PPP header indicates that the frame is an IP data frame, and the CXP 217 performs fast-path frame processing. If the descriptor is backed, then the CXP 217 will typically forward the frame to the CPR or decide that the PPP header should be examined from the frame in buffer memory.

The CXP 217 writes output descriptors received from the descriptor queue 219 to the output queues 221. The output queues 221 are typically managed in hardware, such as where the CXP 217 writes descriptors to the output queues 221, but the output queues 221 typically do not keep track of any queue insert pointers. The DMA controller 223 acts as a frame reassembly engine to rebuild frames from header information in the output queues 221. Each frame is sent to the appropriate module based on the channel number in the descriptor. The descriptors are shuffled from the single inbound DMA descriptor queue 225 to per-channel priority queues 227, where any required queue clipping takes place.

A transmit scheduler 229 drains the per-channel priority queues 227 into the per-channel HDLC transmit (Tx) queues 231, according to the appropriate algorithm.

In one embodiment of the disclosed technology, a processor such as a microprocessor creates a single 32 bit queue selection word for each input channel which acts as a "to do" list. The queue selection words are typically created at an initialization time. Two bits of each 32 bit queue selection word are used to assign a priority to each output data queue, allowing 16 output queues to be represented by each 32 bit queue selection word. In one embodiment of the disclosed technology, the two bit priority value for an output data queue may be assigned as: 00–50%, 01–25%, 10–12.5%, 11–12.5%. It will be recognized by one of ordinary skill in the art that the size of the queue selection word may be increased or decreased, that the number of bits assigned to represent a priority value for an output data queue may be increased or decreased, and the priority percentages represented by the priority value may be changed without loss of compatibility with the disclosed technology.

In one embodiment of the disclosed technology, a system interrupt is generated when a data packet is forwarded into an output data queue. After handling the interrupt, the processor creates an output mask word which associates an output data queue with a queue selection word, which in turn associates a channel and priority level to the output data queue. Alternatively, the processor can monitor the output data queues by another means, such as polling. In any embodiment, the queue selection word is generated once there is data in one or more of the output data queues.

Once a queue selection word has been generated, the system services each data channel based upon the queue selection word until all of the queues for that channel are empty. The system typically rotates through each queue associated with the queue selection word when either a predetermined amount of data, number of bytes, or volume threshold has been exceeded or there is no data left in the channel. After the channels have been serviced, the system performs channel recovery, performs channel maintenance, and generates channel accounting information.

Figure 3:
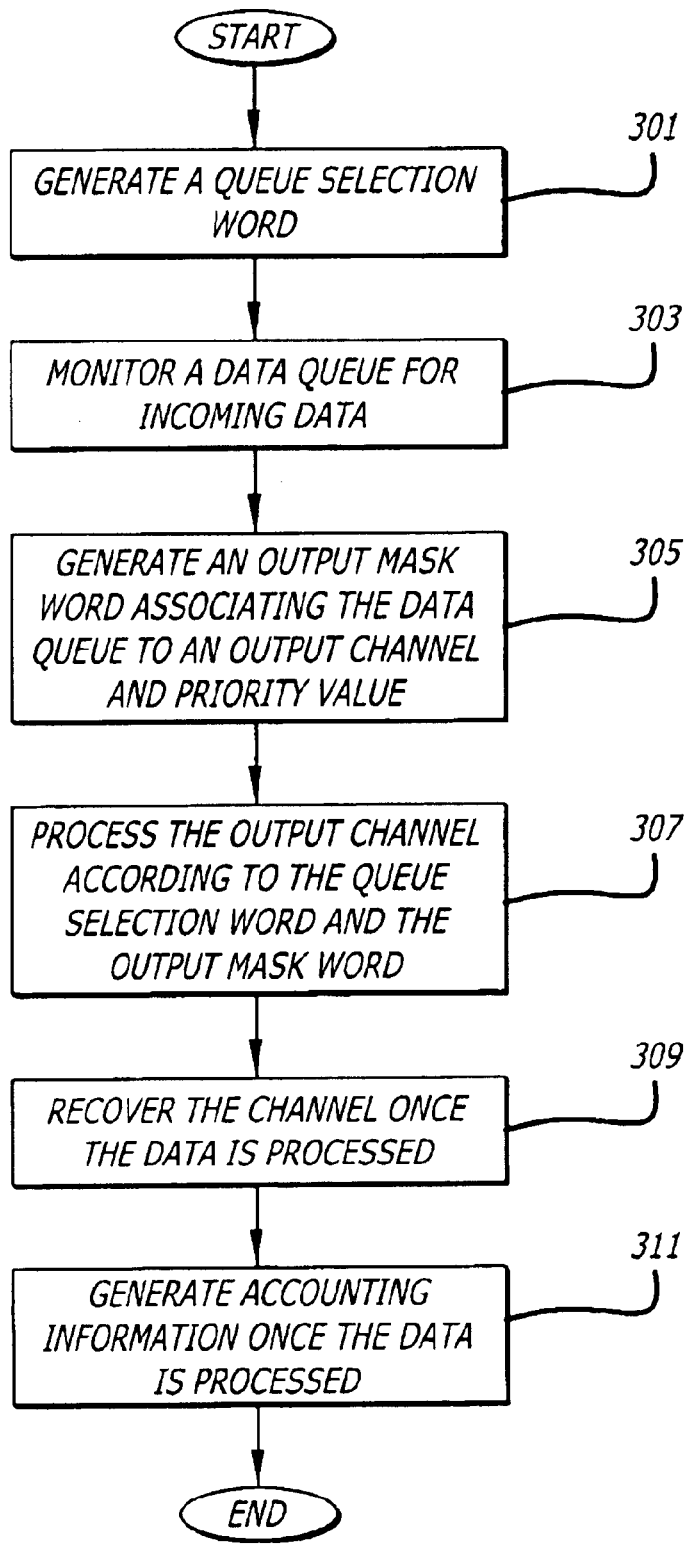
FIG. 3 is a flow chart of a method for flexible egress traffic queuing compatible with the present invention.

FIG. 3 shows a flow chart of a method for flexible egress traffic queuing. At step 301, the processor generates a queue selection word. At step 303, the processor monitors a data queue for incoming data, either through an interrupt mechanism or through channel polling. At step 305, an output mask word is generated which associates the data queue to an output channel and a priority value. At step 307, the data within the output channel is processed according to the queue selection word and the output mask word. At step 309, the channel is recovered once the data is processed. At step 311, accounting information is generated.

While the invention is described in terms of preferred embodiments in a specific system environment, those of ordinary skill in the art will recognize that the invention can be practiced, with modification, in other and different hardware and software environments within the spirit and scope of the appended claims.

What is claimed is:

1. A method for flexible egress traffic queuing comprising the steps of:

generating a plurality of queue selection words, each queue selection word being for one of a plurality of input channels, each queue selection word including a plurality of priority values, each of the plurality of priority values to assign one of a plurality of priority levels to one of a plurality of output data queues;

monitoring each of the plurality of output data queues for data;

generating an output mask word if one of the plurality of output data queues contains data, the output mask word associating the one output data queue with one of the plurality of queue selection words, which in turn associates the one output data queue to one of the plurality of input channels and to one of the plurality of priority values; and processing the one output data queue according to the queue selection word and the output mask word.

2. The method of claim 1 wherein the step of generating a queue selection word comprises the steps of:

generating a 32-bit queue selection word for the data queue; and generating a 2-bit entry within the 32-bit queue selection word for each of a first output channel and a second output channel.

3. An apparatus for flexible egress traffic queuing comprising:

a word generator to generate a plurality queue selection words, each queue selection word being for one of a plurality of input channels, each queue selection word including a plurality of priority values, each of the plurality of priority values to assign one of a plurality of priority levels to one of a plurality of output data queues;

a monitor logically coupled to the word generator to monitor each of the plurality of output data queues for data;

a mask generator logically coupled to the monitor to generate an output mask word if one of the plurality output data queues contains data, the output mask word associating the one output data queue with one of the plurality of queue selection words, which in turn associates the one output data queue to one of the plurality of input channels and to one of the plurality of priority values; and a channel processor logically coupled to the mask generator to process the one output data queue according to the queue selection word and the output mask word.

4. The apparatus of claim 3 wherein the word generator comprises:

a word generator to generate a 32-bit queue selection word for the data queue; and an entry generator logically coupled to the word generator to generate a 2-bit entry within the 32-bit queue selection word for each of a first output channel.

5. An article of manufacture for use in a computer system to enable flexible egress traffic queuing, the article of manufacture comprising a computer usable medium having computer readable program code means embodied in the medium, the program code means including:

computer readable program code means embodied in the computer usable medium for causing a computer to generate a plurality of queue selection words, each queue selection word being for one of a plurality of input channels, each queue selection word including a plurality of priority values, each of the plurality of priority values to assign one of a plurality of priority levels to one of a plurality of output data queues;

computer readable program code means embodied in the computer usable medium for causing a computer to monitor each of the plurality of output data queues for data;

computer readable program code means embodied in the computer usable medium for causing a computer to generate an output mask word if one of the plurality of output data queues contains data, the output mask word associating the one output data queue with one of the plurality of queue selection words, which in turn associates the one output data queue to one of the plurality of input channels and to one of the plurality of priority values; and computer readable program code means embodied in the computer usable medium for causing a computer to process the one output data queue according to the queue selection word and the output mask word.

6. The article of manufacture of claim 5 wherein the computer readable program code means embodied in the computer usable medium for causing a computer to generate a queue selection word comprises:

computer readable program code means embodied in the computer usable medium for causing a computer to generate a 32-bit queue selection word for the data queue; and computer readable program code means embodied in the computer usable medium for causing a computer to generate a 2-bit entry within the 32-bit queue selection word for each of the a first output channel.

* * * * *